March 10, 1942.  J. W. KAYE  2,276,201
STEAM TRAP
Filed Aug. 30, 1940  2 Sheets-Sheet 1
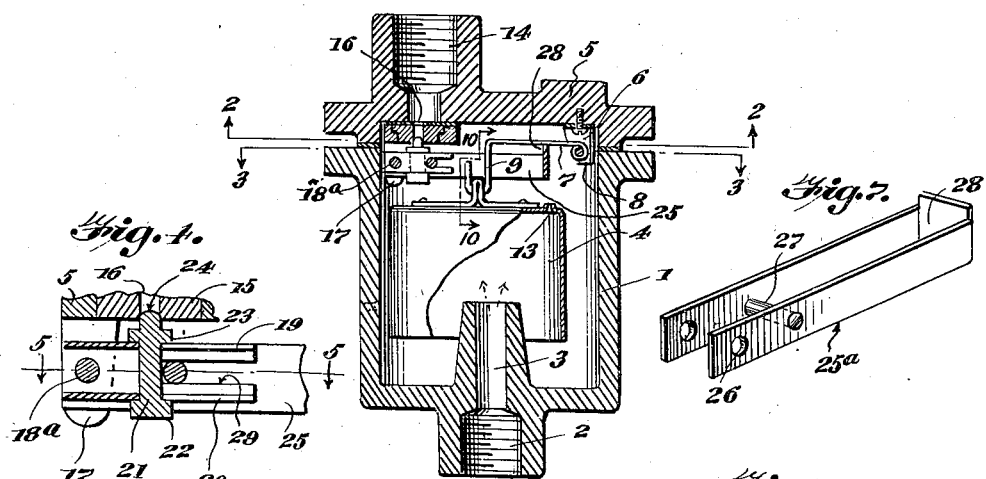
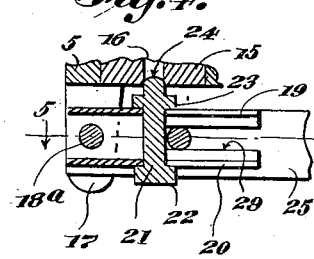
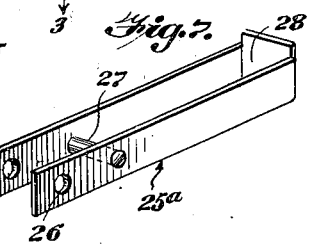
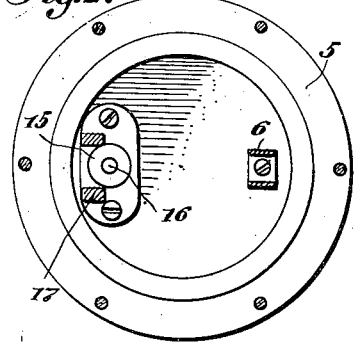
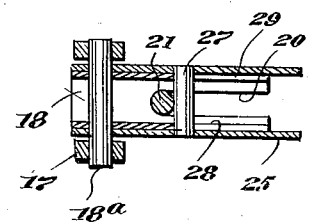
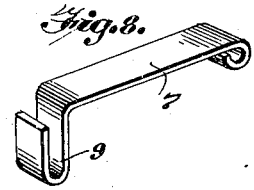
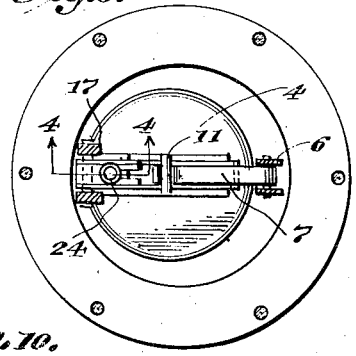
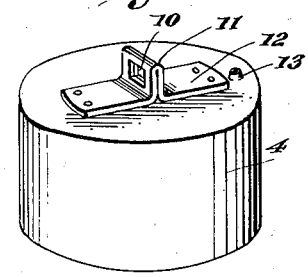
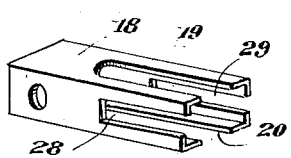
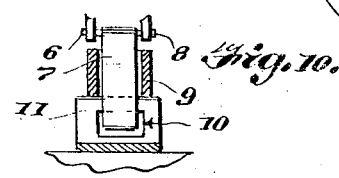
Inventor
JAMES W. KAYE
By Irving L. McCathran
Attorney March 10, 1942.    J. W. KAYE    2,276,201
STEAM TRAP
Filed Aug. 30, 1940    2 Sheets-Sheet 2

Inventor
JAMES W. KAYE

By Irving R. McCathran
Attorney

Patented Mar. 10, 1942

2,276,201

UNITED STATES PATENT OFFICE 2,276,201

STEAM TRAP

James W. Kaye, West Orange, N. J., assignor to Kaye & MacDonald, Inc., West Orange, N. J., a corporation of New Jersey Application August 30, 1940, Serial No. 354,886

5 Claims. (Cl. 137—103)

This invention relates to steam traps and has for one of its objects the production of a steam trap which is easily opened under high pressure and is efficient in operation and provides a durable structure.

A further object of this invention is the production of a steam trap having a compound lever mechanism with only two lever pins, wherein the lever mechanism may be accommodated in a minimum amount of head room, within a very small trap.

Another object of this invention is the production of a steam trap, the mechanism of which utilizes a very high leverage to open the valve of the trap, but little leverage or shock in closing the valve.

Other objects and advantages of the present invention will appear throughout the following specification and claims.

In the drawings:

Figure 1 is a vertical sectional view of the trap;

Figure 2 is a horizontal sectional view taken on line 2—2 of Figure 1;

Figure 3 is a horizontal sectional view taken on line 3—3 of Figure 1;

Figure 4 is a sectional view taken on line 4—4 of Figure 3;

Figure 5 is a sectional view taken on line 5—5 of Figure 4;

Figure 6 is a perspective view of the valve holder;

Figure 7 is a perspective view of the valve lever;

Figure 8 is a perspective view of the float lever;

Figure 9 is a perspective view of the float;

Figure 10 is a vertical sectional view taken on line 10—10 of Figure 1;

Figure 11:
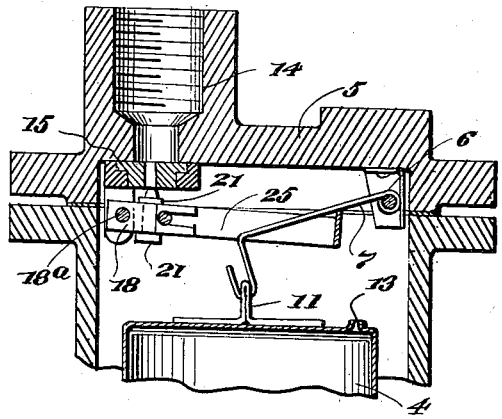
Figure 11 is a fragmentary vertical sectional view showing the float lever prying the valve from its seat.

By referring to the drawings, it will be seen that 1 designates the casing of the steam trap which is provided with an inlet connection 2 at the lower end. A nozzle 3 extends upwardly within the casing 1 for discharging condensation into the casing. An inverted bucket 4 overhangs the nozzle 3, as shown in Figure 1.

The casing 1 carries a trap cover 5 and a hanger bracket 6 is suspended from the cover 5 as shown in Figure 1. A float lever 7 is hingedly secured to the hanger bracket 6 by means of a pin 8 and this lever 7 is provided with a depending hook 9, which hook 9 passes through the aperture 10 of the upstanding portion 11 of the strap 12. The strap 12 is carried by the top of the float 4 and the float 4 is provided with the usual outlet 13 common to such floats or inverted buckets, to provide an air escape or vent.

The trap cover 5 is provided with an outlet port 14 and a valve seat 15 is carried by the inner end of the port 14, the valve seat 15 having an outlet 16. A hanger 17 is suspended below the trap cover 5 adjacent the valve seat 15 and a valve holder 18 is hingedly secured to this hanger 17 by means of a pin 18ª. The valve holder 18 preferably comprises a hollow-box-like structure having a longitudinally extending slot 19 upon the top thereof, and a longitudinally extending slot 20 in the bottom thereof. A valve member 21 extends vertically through the slots 19 and 20 and this valve member 21 is provided with an enlargement 22 at the lower end and an enlargement 23 near the upper end. The enlargement 22 fits against the bottom of the valve holder and straddles the sides of the slot 20 and the enlargement 23 overhangs the top of the valve holder 18 and straddles the slot 19. The valve member 21 is also provided with a rounded valve nose 24 at its upper end which is adapted to snugly fit within the outlet port 16 to close the same.

A U-shaped valve lever 25 is secured to the pin 18ª at one end, the pin 18ª passing through the apertures 26. A valve-retaining pin 27 passes through the valve lever 25 and also passes through the slots 28 and 29 formed in the sides of the valve holder 18 and this pin 27 abuts the valve member 21 and firmly holds the valve member 21 in position upon the valve holder 18. This structure provides a very simple assembly which at the same time will be very rigid and easy to assemble. The valve lever 25 may be provided with an upstanding tongue 28 at its outer end, which normally lies under the float lever 7 and contacts the float lever 7 near its hinged end when the valve member 21 is in a closed position and the rounded nose 24 closes the port 16.

It should be understood that a very simple and efficient mechanism has been provided and that the structure of the valve lever and its assembly will provide a very rigid, strong and durable structure while at the same time presenting a structure which may be produced and maintained at a minimum expense.

As shown in the drawings, it will be noted that the float lever 7 and more particularly the hooked end 9 thereof extends down through the U-shaped valve lever 25, the valve lever 25 having its outer free end extending under the float lever 7. The upstanding portion 11 of the strap 12 is adapted to engage the under face of the under edge 25a of the lever 25, as shown in Figure 10 when the float 4 is raised to an elevated position, thereby forcing the valve lever 25 upwardly and forcing the valve member 21 to a closed position upon the seat 15. Since the float lever 7 is hinged upon the hanger 6, and passes through the valve lever 25 as described, as soon as the bucket 4 drops to a lowered position, the lever 7 will strike upon the upstanding lip 28 and fulcrum thereon, forcing the lever 25 downwardly and forcibly ejecting the valve member 21 away from the port 16.

In actual operation, to close the valve it is necessary for steam to enter and cause the float 4 or inverted bucket to float upwardly or rise to the top of the trap, the trap body being filled with water. The valve 21 is then free to be carried to its seat by the velocity of the water flowing upwardly and out through the port 16. The bucket in rising or moving upwardly also presses the valve tightly upon its seat due to the fact that the upstanding portion 11 will contact the under edge 25a of the lever 25. In any event the valve member 21 will be forced tightly upon its seat either by the pressure and flow or by positive upward movement of the bucket. In either case, the force is applied direct and with very little leverage. Air will escape from the vent 13 in the top of the bucket, the steam condensing in the water above the bucket. As water replaces this air and steam in the bucket, the bucket loses its buoyancy and opens the valve by the powerful leverage caused by the dropping of the bucket 4, and the contact of the lever 7 upon the outer end of the lever 25.

It should be noted that the advantage of the present structure is that very high leverage is used to open the valve against high pressure in the trap but very little leverage is employed in closing the valve. In many of the traps wherein the common compound lever mechanism is used all lever pivots and valves are subjected to severe shock occasioned when closing force is multiplied by the same high leverage that is used to open the valve. The effect upon the pins, pivots and valve will cause a loose motion at times and after a little wear the float may move its full distance of travel without opening the valve. Consequently, an important feature of the present invention is the provision of a steam trap having an improved valve mechanism which is easily opened under high pressure and at the same time is efficient in operation and durable. Another important feature is the provision of a compound lever mechanism which employs only two lever pins and which will require very little head room permitting the mechanism to be accommodated in a small amount of space. Furthermore, it should be noted that the present lever mechanism will permit the valve to fall down away from its seat and to open the valve without fluttering.

Figure 12:
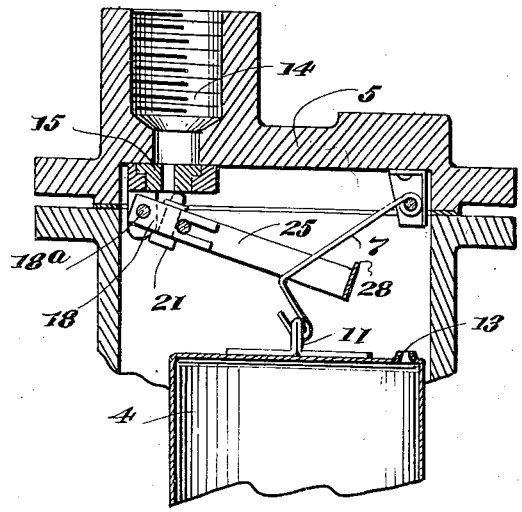
Figure 12 is a similar sectional view showing the float and valve in the open position.

Attention is particularly invited to Figures 11 and 12, Figure 11 illustrating one important feature in the operation of the device wherein a float lever 7 contacts the very outer end of the float lever 25 when the float 4 drops, thereby forcibly pulling the valve member 21 away from the port 16 and out of engagement with the seat 15 thereby prying the valve from its seat with a powerful leverage. In Figure 12 the parts are shown fully opened. Due to the fact that the float valve lever 7 extends through and works within the valve lever 25 in the manner as described, the valve member 21 may be forced tightly to a closed position upon the seat 15 and when contacted by the upstanding portion 11 the valve lever 25 will more tightly force the valve 21 to a closed position.

Having described the invention, what I claim as new is:

1. In a trap of the character described the combination with a float chamber having an outlet valve seat, of a valve adapted to seat on said valve seat, a valve lever carrying the valve and pivoted adjacent the seat, said valve lever having a free outer end, a float in the chamber, a float lever pivoted beyond the free end of the valve lever and adapted to contact the free end of the valve lever for forcing the valve lever to a position to open the valve as said float moves to a lowered position, said valve lever being substantially U-shaped, and said float lever extending through the U-shaped valve lever, the free end of the valve lever extending under the float lever and contacting the float lever near its pivot when the valve is in a closed position.

2. In a trap of the character described the combination with a float chamber having an outlet valve seat, of a valve adapted to seat on said valve seat, a valve lever carrying the valve and pivoted adjacent the seat, said valve lever having a free end, a float in the chamber, a float lever pivoted beyond the free end of the valve lever and the valve lever being U-shaped, the float lever having a downwardly extending hook projecting through the U-shaped valve lever and pivotally engaging the float, the valve lever having an upstanding lip adapted to contact the under face of the float lever adjacent its pivot for exerting a maximum leverage upon the valve lever for prying the valve from its seat and swinging the valve lever to an open position as the float descends.

3. In a trap of the character described the combination with a float chamber having an outlet valve seat, of a valve adapted to seat on said valve seat, a valve lever carrying the valve and pivoted adjacent the seat, said valve lever having a free end, a float in the chamber, a float lever pivoted beyond the free end of the valve lever and the valve lever being U-shaped, the float lever having a downwardly extending hook projecting through the U-shaped valve lever and pivotally engaging the float, the valve lever having an upstanding lip adapted to contact the under face of the float lever adjacent its pivot for exerting a maximum leverage upon the valve lever for prying the valve from its seat and swinging the valve lever to an open position as the float descends, and said float having means for engaging the under face of the valve lever to force the valve lever upwardly and move the valve to a closed position upon its seat as the float is raised to its uppermost position.

4. A valve mechanism comprising a hanger, a valve seat adjacent the hanger, the valve seat having a port, a valve holder, a valve carried by the valve holder and adapted to close the port in the valve seat, a hollow valve lever carried by the valve holder and having a free end, a float lever pivotally supported beyond the free end of the valve lever, a float carried by one end of the float lever, the float lever extending through the hollow valve lever, the free end of the valve lever being adapted to contact the under face of the float lever in a manner whereby the dropping of the float will forcibly swing the float lever downwardly through the medium of the float lever contacting the free end of the valve lever to move the valve to an open position beyond and free of the port in the valve seat.

5. A valve mechanism of the class described comprising a valve seat having a port, a valve holder pivotally mounted adjacent the valve seat, said valve holder comprising a box-like structure having upper and lower slots, the valve holder also having side slots, a valve member fitted within the upper and lower slots and having means overhanging the upper and lower portions of the valve holder, a U-shaped valve lever straddling the valve holder and secured to the pivot of the valve holder, said valve lever having a free end, a valve-retaining pin carried by the valve lever and extending through the side slots of the valve holder and contacting the valve to hold the valve in position, and a float lever adapted to be pivoted beyond the free end of the valve lever and extending through the valve lever for supporting a float.

JAMES W. KAYE.